United States Patent
Polato et al.

(10) Patent No.: US 10,149,351 B2
(45) Date of Patent: Dec. 4, 2018

(54) DEVICE FOR GENERATING AN ALTERNATE RADIOFREQUENCY ELECTROMAGNETIC FIELD, CONTROL METHOD AND PLANT USING SUCH DEVICE

(71) Applicant: OFFICINE DI CARTIGLIANO SPA, Cartigliano (vi) (IT)

(72) Inventors: Antonio Polato, Marostica (IT); Riccardo Marin, Marostica (IT)

(73) Assignee: Officine di Cartigliano SpA, Cartigliano (VI) (IT)

( * ) Notice: Subject to any disclaimer, the term of this patent is extended or adjusted under 35 U.S.C. 154(b) by 87 days.

(21) Appl. No.: 14/435,281

(22) PCT Filed: Oct. 22, 2013

(86) PCT No.: PCT/IB2013/059541
§ 371 (c)(1),
(2) Date: Apr. 13, 2015

(87) PCT Pub. No.: WO2014/064612
PCT Pub. Date: May 1, 2014

(65) Prior Publication Data
US 2015/0237683 A1 Aug. 20, 2015

(30) Foreign Application Priority Data
Oct. 22, 2012 (IT) .............................. VI2012A0280

(51) Int. Cl.
*A23L 3/01* (2006.01)
*H05B 6/48* (2006.01)

(52) U.S. Cl.
CPC . *H05B 6/48* (2013.01); *A23L 3/01* (2013.01)

(58) Field of Classification Search
None
See application file for complete search history.

(56) References Cited

U.S. PATENT DOCUMENTS

| | | |
|---|---|---|
| 2,517,948 A | 8/1950 | Warren et al. |
| 2,640,908 A | 6/1953 | Welch, Jr. |

(Continued)

*Primary Examiner* — Ibrahime A Abraham
*Assistant Examiner* — Gyounghyun Bae
(74) *Attorney, Agent, or Firm* — Themis Law

(57) ABSTRACT

A device for generating an alternating radio-frequency electromagnetic field in a working area includes an applicator emitting the electromagnetic field, an oscillator providing an alternate voltage and electric current having a predetermined value and a predetermined frequency to the applicator, a power supply supplying a substantially DC voltage to the oscillator, and a control system controlling the electrical parameters of the AC voltage, the AC current and/or the frequency provided to the applicator by the oscillator. The control system includes an input port connected to the electric power network, a first electronic control circuit connected to the input port and substantially instantaneously varying the electrical parameters and instantaneous control of the field emission power, and a second electronic control circuit regulating the operation of the oscillator. The first electronic circuit has an output connected to the power supply. A plant includes the device and a control method for the device.

9 Claims, 4 Drawing Sheets

(56) References Cited

U.S. PATENT DOCUMENTS

| | | | | |
|---|---|---|---|---|
| 3,611,016 A * | 10/1971 | Rogers | H03K 19/017545 | 333/101 |
| 4,323,861 A * | 4/1982 | Sandler | H05B 6/6452 | 219/718 |
| 4,383,224 A * | 5/1983 | Saari | H03K 3/3545 | 326/68 |
| 4,430,627 A * | 2/1984 | Machida | H03G 3/3005 | 331/109 |
| 4,780,585 A * | 10/1988 | Rochas | H05B 6/788 | 219/693 |
| 4,926,144 A * | 5/1990 | Bell | H03C 3/08 | 331/177 V |
| 4,978,826 A * | 12/1990 | DeRuiter | H05B 6/50 | 219/771 |
| 5,058,198 A * | 10/1991 | Rocci | H03H 7/482 | 333/100 |
| 5,556,567 A * | 9/1996 | Landwehr | H05B 6/50 | 219/771 |
| 5,602,515 A * | 2/1997 | Held | H03B 5/10 | 331/114 |
| 5,822,442 A * | 10/1998 | Agnew | H03G 7/08 | 330/278 |
| 5,973,575 A * | 10/1999 | Kamogawa | H03B 5/1203 | 331/117 D |
| 6,303,166 B1 * | 10/2001 | Kolbe | A23B 4/01 | 219/771 |
| 6,617,557 B1 * | 9/2003 | Ryan | C09D 167/00 | 219/634 |
| 6,870,442 B1 * | 3/2005 | Suzuki | H04B 1/52 | 333/103 |
| 6,909,885 B2 * | 6/2005 | Kennedy | H04B 1/10 | 333/103 |
| 6,917,789 B1 * | 7/2005 | Moloudi | H03B 21/01 | 333/103 |
| 7,265,641 B2 * | 9/2007 | Schulz | H03B 5/14 | 331/116 FE |
| 7,512,383 B2 * | 3/2009 | Essabar | H04B 5/0012 | 331/59 |
| 7,586,381 B2 * | 9/2009 | Rohde | H03B 5/1847 | 331/117 R |
| 7,702,296 B2 * | 4/2010 | Siu | H03F 1/223 | 333/100 |
| 2002/0047009 A1 | 4/2002 | Flugstad et al. | | |
| 2009/0095402 A1 * | 4/2009 | Hall | B29C 65/04 | 156/64 |
| 2009/0195160 A1 * | 8/2009 | Shinogi | H05B 41/24 | 315/39 |
| 2011/0130093 A1 * | 6/2011 | Walley | G06K 7/10207 | 455/41.1 |
| 2012/0293272 A1 * | 11/2012 | Yoder | H01Q 1/38 | 331/108 R |
| 2013/0233249 A1 * | 9/2013 | Zhu | A01K 1/031 | 119/452 |
| 2013/0257168 A1 * | 10/2013 | Singh | H02J 17/00 | 307/104 |

* cited by examiner

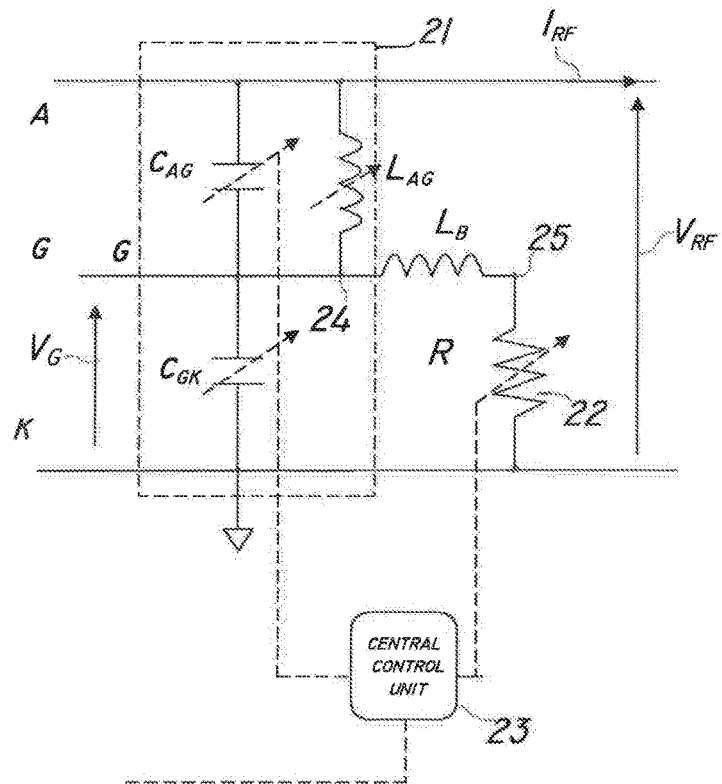

FIG. 7 a) providing an applicator for emitting an electromagnetic field in a working area b) providing an oscillator which provides an alternate voltage and an alternate current having a predetermined value and a predetermined frequency to the applicator c) supplying a substantially DC voltage to the oscillator d) varying the electrical parameters of voltage, current, and/or frequency provided to the applicator through appropriate control means

FIG. 8

DEVICE FOR GENERATING AN ALTERNATE RADIOFREQUENCY ELECTROMAGNETIC FIELD, CONTROL METHOD AND PLANT USING SUCH DEVICE

FIELD OF THE INVENTION

The present invention generally finds application in the field of radio-frequency treatment systems, and particularly relates to a device for generating an alternating radio-frequency electromagnetic field.

The invention also relates to a method of controlling a device for generating an alternating radio-frequency electromagnetic field, and a product treatment plant comprising such generator device.

BACKGROUND ART

Plants are known for treating and conditioning various types of products by application and use of alternate electromagnetic fields having various frequencies.

Particularly, plants are known which operate using electromagnetic fields operating in the microwave or radio-frequency range, and used for drying relatively wet products, such as hides or painted products.

Electromagnetic fields are further used in the food processing industry, e.g. for pasteurization of products containing milk or eggs products and in general for conditioning and/or sanitization treatment of any food product.

The applicant hereof manufactures and sells a treatment plant which uses an alternate radio-frequency electromagnetic field, such plant basically comprising a voltage generator that supplies voltage to an applicator having a pair of electrodes for producing the electromagnetic field through which the products to be treated are designed to pass.

The applicator further comprises a capacitor, which is electrically connected to the electrodes and has a pair of opposed plates. The distance between the plates may be mechanically adjusted to vary the capacitance of the capacitor, thereby varying the supply voltage to the electrodes and, accordingly, the electromagnetic field emission power.

With power adjustment, the heating temperature generated by the electromagnetic field on the products to be treated may be varied.

While this solution has shown remarkable effectiveness and reliability, it is still susceptible of improvement, namely concerning regulation of the electromagnetic field power.

The mechanical movement of the plates of the capacitor for varying the field power has relatively long response times, which do not allow instantaneous operating temperature adaptation.

U.S. Pat. No. 2,640,908, which represents the closest prior art, discloses an oscillator which comprises a pair of triodes having the characteristics of the preamble of claim 1.

DISCLOSURE OF THE INVENTION

The object of the present invention is to obviate the above drawbacks, by providing a device for applying a radio-frequency electromagnetic field that is highly efficient and relatively cost-effective.

A particular object is to provide a device for applying a RF electromagnetic field that, when used in a plant for RF treatment of products in general, allows quick and dynamic regulation of product treatment temperature.

A further object is to provide a device for applying a RF electromagnetic field that ensures high safety by preventing generation of unexpected electric discharges.

Another object is to provide a plant for treating products by applying a RF electromagnetic field that allows effective treatment of products without affecting their inherent properties.

Another important object of the present invention is to provide a method of controlling a plant for RF treatment of products that allows quick and immediate regulation of one or more electrical control parameters of the plant.

These and other objects, as better explained hereafter, are fulfilled by a device for generating an alternate electromagnetic field as defined in claim 1.

The control means comprise an input connected to the electric power network, a first electronic control circuit which is connected to said input for substantially instantaneous variation of such electrical parameters and instantaneous control of the field emission power, a second electronic control circuit for regulating the operation of such oscillator, wherein the first electronic circuit has an output connected to such power supply means.

With this particular configuration, field emission power, and hence product treatment temperature, may be actually regulated without delay, as no mechanical regulation is required to set the plant to the new operating configuration.

In a further aspect, the invention relates to a method of controlling a device for generating an alternating electromagnetic field as defined hereinafter.

In yet another aspect, the invention relates to a plant for treating products with an alternating electromagnetic field as defined hereinafter.

Advantageous embodiments of the invention are defined in accordance with the dependent claims.

BRIEF DESCRIPTION OF THE DRAWINGS

Further features and advantages of the invention will become more apparent from the detailed description of a few preferred, non-exclusive embodiments of the device of the invention, which are described by way of non-limiting examples with the help of the accompanying drawings in which:

FIGS. 3 to 7 show simplified wiring diagrams in various embodiments of a detail of FIG. 1;

FIG. 8 is a schematic block diagram of the method of controlling a device for generating an electromagnetic field according to the invention.

DETAILED DESCRIPTION OF A PREFERRED EMBODIMENT

Figure 1:
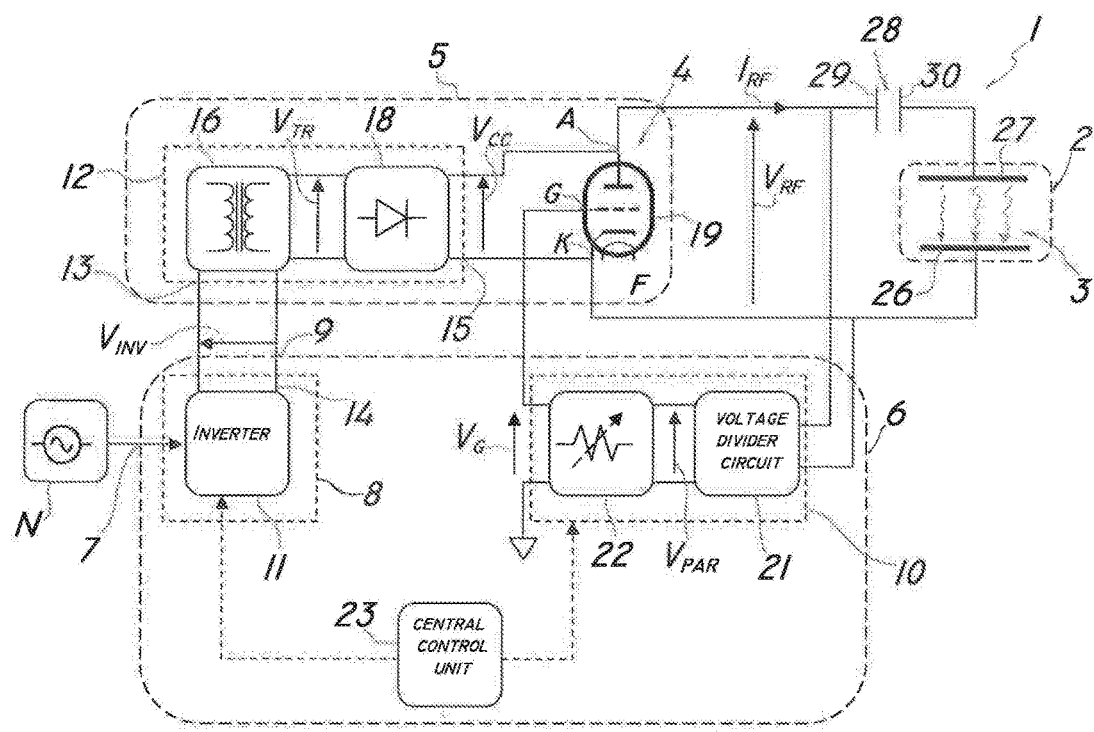
FIG. 1 is a schematic block view of a device for generating an electromagnetic field according to the invention.

FIG. 1 shows a device for generating an alternate radio-frequency electromagnetic field in a predetermined working area.

The device, generally designated by numeral 1, may be designed to generate an alternating electromagnetic field at a substantially constant frequency or, alternatively, at a frequency that falls within a predetermined band.

Preferred frequencies for the electromagnetic field range from 5 MHz to 500 MHz. Particularly, suitable frequencies may be selected within frequency ranges admitted by international standards for civil or industrial uses, whose central values are 6.78-13.56-27.12-40.68-433.92 MHz.

More preferably, the operating frequency will range from 20 MHz to 50 MHz, as best results were experimentally found to be obtained with these lower values, e.g. about 27.12 MHz or 40.68 MHz.

The device 1 may be used in any plant for RF treatment of products.

A general plant incorporating the device of the invention, not shown, may find application in the food processing industry, e.g. for sterilization, pasteurization and/or treatment of food products in general, particularly milk- and/or egg-based products, flours, grains and the like, as described and illustrated in EP2375910 and EP1912512, both by the Applicant hereof.

Further promising applications are found in the field of tannery and treatment of industrial hides in general, e.g. for reducing the initial relative moisture content in hides that come from tanning baths or other industry-specific treatments.

The Applicant has provided an industrial hide drying plant which uses a device for generating an alternating RF electromagnetic field having flat electrodes for generating a substantially uniform electromagnetic field through which the hides to be treated are designed to pass.

A further application of a similar plant may be treatment and drying of polymeric materials, such as profiles or the like that have undergone a surface treatment with water-based paints.

The plant of the invention essentially differs from such prior art plants for the particular configuration of the alternate RF electromagnetic field generator device.

The device 1 basically comprises an applicator 2 for emitting the electromagnetic field in the working area 3, an oscillator 4 for providing an alternate voltage $V_{RF}$ and electric current $I_{RF}$ having a predetermined value and a predetermined frequency and power supply means 5 for supplying a substantially DC voltage $V_{CC}$ to the oscillator 4.

The working area 3 is the area through which the products to be treated are designed to pass, and is designed according to the type of products and the particular means for feeding them through the plant.

The feeding means, not shown and known per se, may comprise one or more conduits or pipes, in case of pasty, semi-pasty, liquid or powdered products, or a belt conveyor, a roller conveyor or a similar device in case of loose products or industrial hides, polymeric profiles and large products in general.

The device 1 further comprises control means (or system) 6 associated with the power supply means 5 for controlling the electrical parameters of the alternate AC voltage $V_{RF}$, current $I_{RF}$, and/or frequency provided to the applicator 2 by the oscillator 4.

Conveniently, the control means 6 may be designed to control the electrical parameters concerning the amplitude and/or frequency of the voltage $V_{RF}$ and/or the current $I_{RF}$ provided to the applicator 2.

The control means 6 comprise an input 7 connected to the electric power network N, a first electronic control circuit 8 which is connected to the input 7 for substantially instantaneous variation of such electrical parameters and hence for instantaneous control of the field emission power.

The first electronic control circuit 8 further has an output 9 connected to the power supply means 5 and the control means 6 comprise a second electronic control circuit 10 for regulating the operation of the oscillator 4.

Furthermore, the first control circuit 8 may control the electrical parameters of the electric signals provided to the power supply means 5.

A variation of such electrical parameters will cause instantaneous variation of the alternate voltage $V_{RF}$ and current $I_{RF}$ provided to the applicator 2.

Such voltage variation will cause a corresponding variation of the power of the electromagnetic field emitted in the working area 3 with a particularly short delay or with no delay at all.

In a particular, non-exclusive embodiment, the first electronic control circuit 8 may comprise an inverter 11, for converting the standard voltage of the network N, having a constant frequency and a constant rms value, into an AC voltage $V_{INV}$ having a controlled rms value and/or a controlled frequency.

Conveniently, as best shown in FIG. 1, the supply means 5 may include an step-up transformer circuit 12 with an input 13 connected to the output 14 of the inverter 11 to receive the voltage $V_{INV}$, and an output 15 connected to the oscillator 4.

The step-up transformer circuit 12 may amplify and change the voltage $V_{INV}$ at the output of the inverter 11 to provide a substantially DC voltage VCC to the oscillator 4.

The step-up transformer circuit 12 may comprise a voltage boost transformer 16 having an input 13 connected to the output 14 of the inverter 11 and a rectifier 18 downstream from the transformer 16 having an output 15 connected to the oscillator 4.

In a particular configuration of the device, designed for food processing, the voltage $V_{INV}$ at the output 14 of the inverter 11 may be an AC voltage, with an value ranging from 0 V to 400 V, the output voltage $V_{TR}$ of the transformer 16 will also be an AC voltage with a rms value not exceeding 9000 V, whereas the DC voltage $V_{CC}$ at the output of the rectifier 18 is limited to about 12000 V.

Preferably, as best shown in FIG. 1, the oscillator 4 may comprise at least one triode 19 having two power terminals, i.e. the anode A and the cathode K respectively.

The triode 19 may also comprise a grid terminal G which is adapted to receive a control signal designed to vary the electrical parameters of the signal between the anode A and the cathode K.

Figure 2:
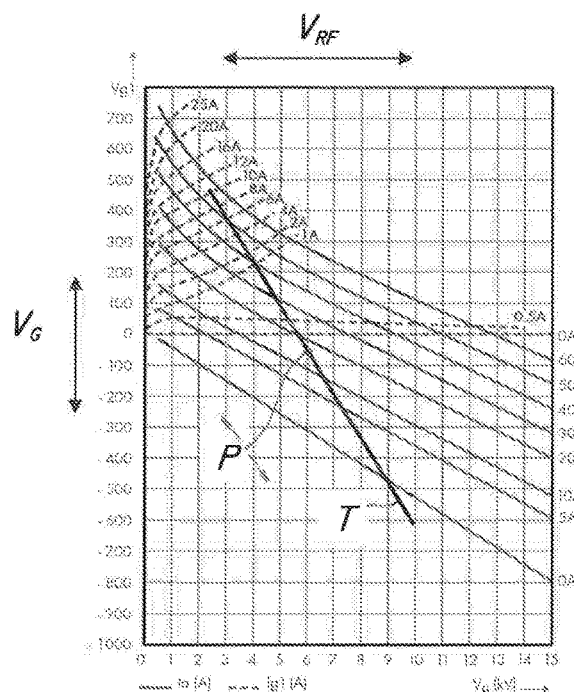
FIG. 2 shows the current-voltage characteristic of a common diode as used in the plant of FIG. 1.

FIG. 2 shows a voltage-current characteristic of a bias triode whose instantaneous operating point lies along a substantially straight segment T.

Particularly, a controlled displacement of the operating point P along such segment will cause a corresponding predetermined variation of the AC voltage $V_{RF}$ between the anode A and the cathode K, which is represented on the x-axis in the diagram of FIG. 2.

The displacement of the operating point P may be controlled by varying the voltage $V_G$ in the grid terminal G of the triode 19, which is represented on the y-axis of the diagram of FIG. 2.

As best shown in FIG. 1, the bias of the triode acting as an oscillator is such that the anode A and the cathode K are supplied with the DC voltage $V_{CC}$ present at the output 15 of the rectifier.

In this case, the oscillation voltage $V_{RF}$ at the output of the anode A and cathode K terminals of the triode 19 may be varied by controlling the waveform of the voltage $V_G$ in the grid terminal G.

The use of the triode 19 as an oscillator at a predetermined frequency requires a substantially periodic voltage $V_G$ with a positive wave portion to be applied to the grid terminal G.

Particularly, the duration of the positive grid voltage $V_G$ may be equal to a predetermined angular fraction of the oscillation period of the voltage $V_{RF}$ provided to the applicator 2.

This angular fraction may be substantially close to one third of a round angle, and may particularly range from about 80° to about 150°.

Furthermore, the triode 19 comprises a heating filament F with a power supply circuit that is known per se and will not be further described herein.

The second electronic control circuit 10 may be connected to the grid terminal G of the triode 19 for controlling the grid voltage $V_G$ according to the instantaneous value of the AC voltage $V_{INV}$ at the output of the inverter 11.

Particularly, as schematically shown in FIG. 1, the second electronic control circuit 10 may comprise a voltage divider circuit 21 connected to the input of the applicator 2 for drawing a predetermined portion $V_{PAR}$ of the voltage $V_{RF}$.

Furthermore, the second electronic control circuit 10 may comprise a DC variable resistance circuit 22, downstream from the divider circuit 21.

The variable resistance circuit 22 may be connected to the grid terminal G of the triode 19 to adapt the average value of the grid voltage VG such that the triode 19 is continuously kept oscillating.

Conveniently, the control means 6 may comprise a programmable central control unit PLC 23, which is adapted to control at least the output voltage $V_{INV}$ of the inverter 11, and the second electronic control circuit 10 for varying the power emitted by the electromagnetic field generated by the applicator 2 and for ensuring constant oscillation of the triode 19.

Particularly, a central control unit 23 may be programmed to control the second electronic control circuit 10 by varying the DC voltage value of the variable resistance circuit 22 according to the instantaneous value of the voltage $V_{RF}$ provided to the applicator 2.

Furthermore, the central control unit 23 may comprise interface means, not shown, which are used to enter and/or display the data concerning the value of the electrical parameters provided and/or detected in the first 8 and second 10 electronic control circuits.

Particularly, the central control unit 23 may comprise an alphanumeric keyboard, not shown, for entering data concerning the values of the desired electrical parameter and a display, also not shown and known per se, for displaying the data concerning the instantaneous values of such parameters.

The divider circuit 21, as best shown in FIGS. 3 to 7, may comprise the pair of inherent capacitors $C_{AG}$, $C_{GK}$ of the triode 18 which are present between the anode A and the grid G and between the grid G and the cathode K respectively.

Figure 3:
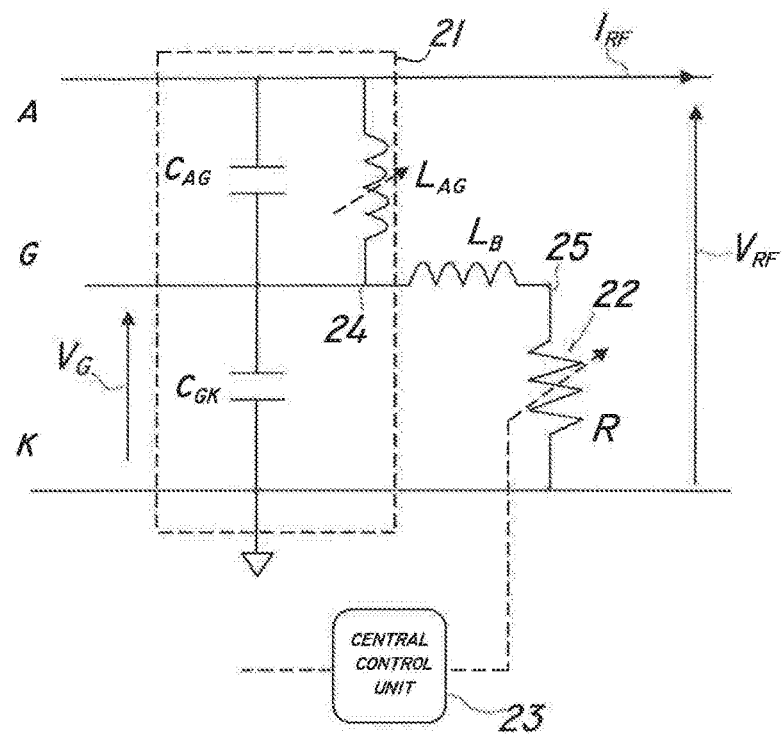

The divider circuit 21, as best shown in FIG. 3, may also comprise an inductor LAC inserted between the anode A and the grid G of the triode 19 and an inductor $L_B$ for blocking the DC component, having a first terminal 24 electrically connected to the grid terminal G.

Figure 4:
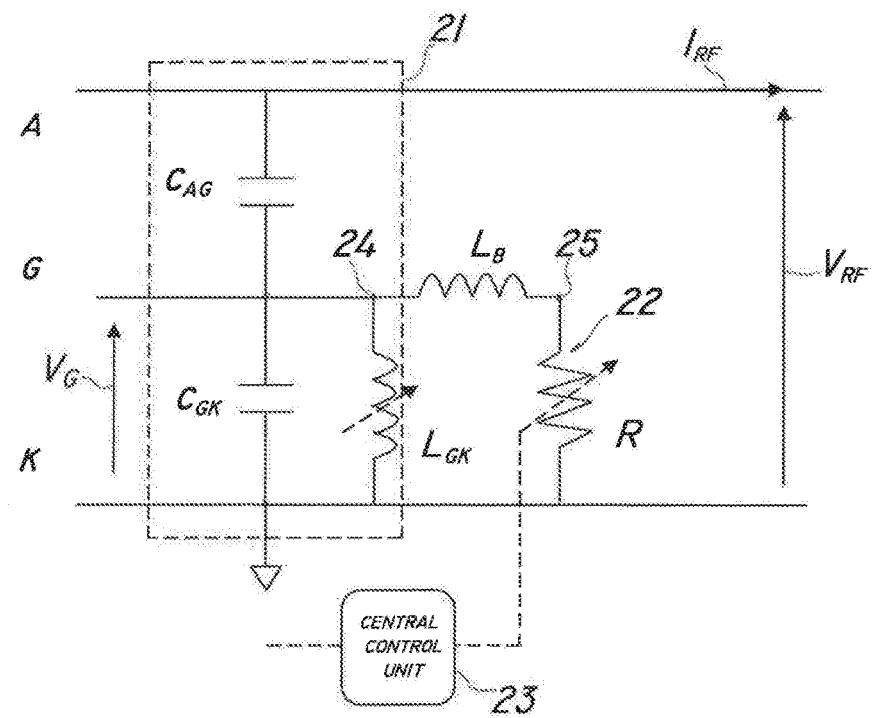

Alternatively, as shown in FIG. 4, the divider circuit 21 may differ from the diagram of FIG. 3 in the presence of an inductor $L_{GK}$ connected between the grid G and the cathode K of the triode 19.

This configuration has the advantage of using an inductor whose maximum operating voltage is lower than that used in the diagram of FIG. 3.

Thus, during operation of the triode, the voltage between the grid G and the cathode K is considerably lower than the voltage between the anode A and the grid G.

Conveniently, the value of the inductors $L_{AK}$ or $L_{GK}$ may be varied during calibration to adjust the value of the voltage $V_{PAR}$ according to the voltage $V_{RF}$ provided to the applicator 2. Particularly, the voltage $V_{PAR}$ may be a predetermined fixed portion of the voltage $V_{RF}$ presented to the applicator 2.

Conveniently, the voltage $V_{PAR}$ may range from 10% to 20% the value of the voltage $V_{RF}$ and is preferably about 15% the value of the voltage $V_{RF}$.

The variable resistance circuit 22 may be connected downstream from the divider circuit 21 and may be electrically connected to the second terminal 25 of the inductor $L_B$ and the cathode K of the triode 19.

FIGS. 3 to 7 schematically show three different types of variable resistance circuits 22.

Particularly, in the embodiment of FIGS. 3 and 4, the variable resistance circuit 22 may be electrically equivalent to a variable resistor R.

Figure 5:
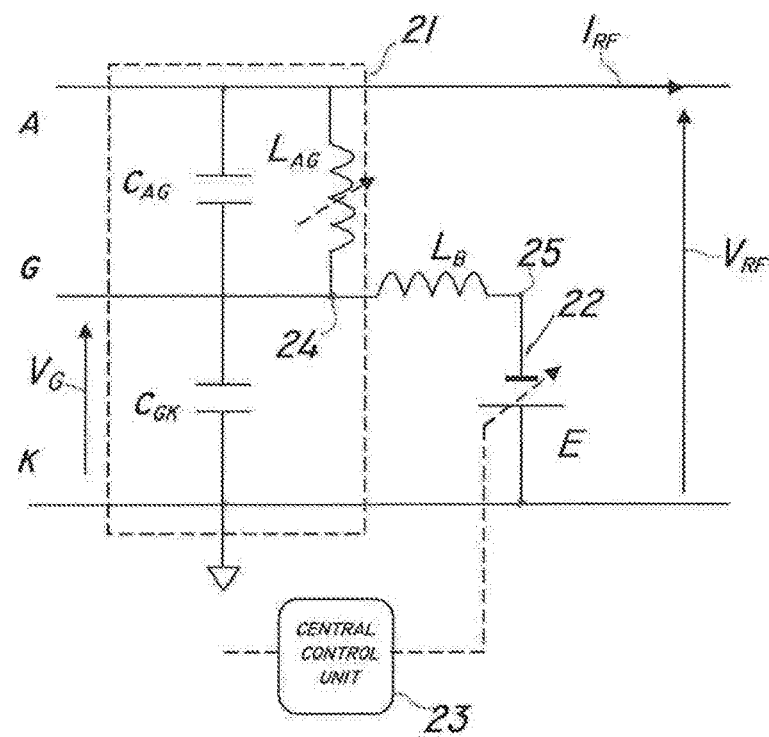

Alternatively, as shown in FIG. 5, the variable resistance circuit 22 may be electrically equivalent to a DC voltage generator, with a variable electrically potential tension E.

Conveniently, the central control unit 23 may be programmed to control the ohmic value R of the equivalent variable resistor or the value of the electrically potential tension E of the equivalent generator according to the instantaneous value of the voltage $V_{RF}$ provided to the applicator 2.

Figure 6:
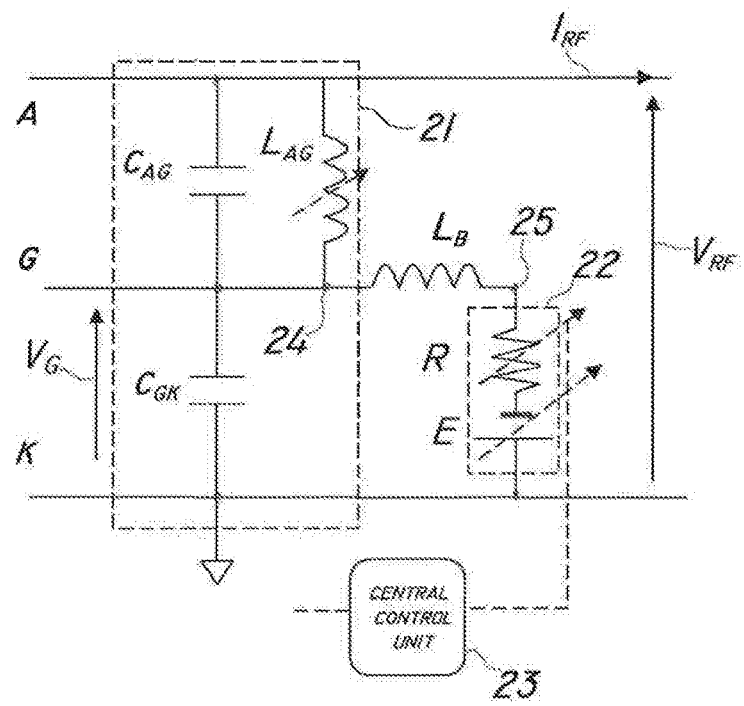

Conveniently, as shown in FIG. 6, the diagrams of FIG. 4 and FIG. 5 may be combined to form an variable resistance circuit 22 substantially equivalent to a variable resistor R connected in series to a voltage generator E.

In this case, the central control unit 22 may be designed to simultaneously control both the ohmic value of the equivalent resistor and the electromotive force of the generator R.

The divider circuit 21 and the variable resistance circuit 22 may be designed to provide a voltage $V_G$ to the grid terminal G which is substantially in phase opposition to the voltage $V_{RF}$ provided to the applicator 2.

In the diagrams as shown in FIGS. 3 to 6, the voltage $V_G$ at the input of the grid terminal G of the triode 19 is obtained by adding the variable-amplitude DC voltage to an AC signal $V_{PAR}$ having a substantially constant amplitude.

In a further configuration of the second electronic control circuit, as shown in FIG. 7, the voltage $V_G$ at the grid terminal G may be obtained by the sum of a variable DC voltage provided by the variable resistance circuit 22 to a variable AC voltage provided by the divider circuit 21.

The variation of the amplitude of the AC voltage provided by the divider circuit 21 may be obtained by appropriately varying the capacitance value of the capacitors $C_{AG}$ and $C_{GK}$ of the triode 19 between the anode A and the grid G and between the grid G and the cathode K respectively.

Conveniently, the central control unit 23 may be designed to simultaneously control the capacitance values of the capacitors $C_{AG}$ and $C_{GK}$ and the ohmic value of the equivalent variable resistor R.

Furthermore, the control means 6 may comprise an oscillation frequency control circuit, not shown, downstream from the triode 19 and adapted to vary the voltage frequency $V_{RF}$ provided to the applicator 2.

Conveniently, as shown in the block diagram of FIG. 1, the applicator 2 may comprise at least one pair of electrodes 26, 27 for emitting and directing the electromagnetic field in the working area 3.

The shape, type and number of electrodes may be selected according to the particular type of plant for which the device 1 is designed and particularly the electrodes may be configured as described in the above mentioned patent documents by the Applicant hereof.

For example, they may be formed with a pair of facing plates, placed at a predetermined distance from each other for radiating a substantially uniform electromagnetic field into the gap therebetween, or they may be annular electrodes adapted to have said product feeding conduit extending therethrough such that products may pass through the field.

Conveniently, the applicator 2 may comprise a capacitor 28 with plates 29, 30 electrically connected in series to the electrical terminals of the electrodes 26, 27.

Furthermore, the capacitor 28 may be designed to limit the value of the electric current provided at the output of the power supply means 5 if the electrodes 26,27 are short-circuited.

This might occur accidentally or due to malfunctions of the device 1 and the presence of the capacitor 28 may ensure that a limiting load is provided at the output of the step-up transformer 11, thereby reducing the current provided to the triode 18.

Conveniently, the plates 29, 30 may be substantially flat and face each other at a fixed distance.

Thus, the capacitor may have a fixed-value capacitance which is adapted to define an impedance with an ohmic value sufficient to limit the current generated by the triode 19 if the electrodes 26, 27 are short-circuited.

Furthermore, proper adjustment of the distance between the plates of the capacitor 28 will allow the impedance value of the applicator 2 to be adapted to that of the power supply means 4.

In a further aspect, the invention relates to a method of controlling the above described device 1 for generating the alternate RF electromagnetic field, as shown in FIG. 8, which essentially comprises a step a) of providing an applicator 2 for emitting the electromagnetic field in a working area 3, a step b) of providing an oscillator 4 which provides an alternate voltage $V_{RF}$ and an alternate current $I_{RF}$ having a predetermined value and a predetermined frequency to the applicator 2.

There are further provided a step c) of supplying a substantially DC voltage $V_{CC}$ to the oscillator 4 and a control step d) which comprises varying the electrical parameters of voltage, current and/or frequency provided to the applicator 2 through appropriate control means 6.

Conveniently, the control step d) comprises varying the electrical parameters to instantaneously vary the electromagnetic field emission power and the controlled power supply to the oscillator 4.

Furthermore, the control means 6 comprise an inverter 11 and the oscillator 4 comprises a triode 19.

The inverter 11 is designed to convert the network voltage into an AC voltage having a variable rms value and/or a variable frequency.

Also, the triode 19 is powered with a grid voltage $V_G$, which is controlled to ensure constant oscillation thereof as the AC voltage $V_{INV}$ transformed by the inverter 11 is varied.

Particularly, the control step d) may be obtained by varying the alternate voltage and/or frequency at the output 14 of the inverter 11 without requiring any mechanical adjustment that would inevitably involve plant response delays.

The control step d) may be carried out while maintaining the waveform of the voltage $V_G$ applied to the grid G of the triode 19 substantially constant.

The control of the voltage $V_G$ at the grid G of the triode 19 will allow the triode to keep on oscillating, such that it may provide a voltage $V_{RF}$ adapted to supply the applicator 2, between the anode A and the cathode K.

Thus, the control step d) will control the positive portion of the grid voltage $V_G$, such that the latter has a duration equal to a predetermined angular fraction of the oscillation period.

The above disclosure clearly shows that the device of the invention fulfills the intended objects and particularly meets the requirement of allowing immediate and dynamic regulation of electromagnetic field emission power, for delay-free regulation of product treatment temperature.

Furthermore, if the plant operates with no load between the electrodes, the use of an inverter will allow voltage to be regulated to values lower than the operating values to prevent the formation of electric arcs.

The device, plant and method of the invention are susceptible to a number of changes or variants, within the inventive concept disclosed in the appended claims. All the details thereof may be replaced by other technically equivalent parts, and the materials may vary depending on different needs, without departure from the scope of the invention.

While the device, plant and method have been described with particular reference to the accompanying figures, the numerals referred to in the disclosure and claims are only used for the sake of a better intelligibility of the invention and shall not be intended to limit the claimed scope in any manner.

The invention claimed is:

1. A device for generating an alternating radio-frequency electromagnetic field in a working area (3), comprising:
an applicator (2) having at least one pair of electrodes (26, 27) for emitting the electromagnetic field ranging from 5 MHz to 500 MHz in the working area (3);
an oscillator (4) for providing an alternate AC voltage ($V_{RF}$) and an alternate current ($I_{RF}$) each having a predetermined value and a predetermined frequency;
a power supply (5) for supplying a DC voltage ($V_{CC}$) to said oscillator (4), said oscillator (4) comprising a triode (19) having a grid terminal (G), an anode (A), and a cathode (B); and
a control system (6) associated with said power supply (5) for controlling electrical parameters of one or more of said alternate AC voltage ($V_{RF}$), alternate current ($I_{RF}$), or frequency provided to said applicator (2) by said oscillator (4);
wherein said control system (6) comprises a programmable central control unit PLC (23), an input port (7) connected to an electric power network (N), a first electronic control circuit (8) which is connected to said input port (7) for instantaneously varying said electrical parameters and instantaneously controlling field emission power to said power supply (5) through an output port (9), a second electronic control circuit (10) for regulating operation of said oscillator (4) connected to the grid terminal (G) of said triode (19), wherein said first electronic control circuit (8) is an inverter (11) converting an electric power network voltage having a constant frequency and a constant RMS value, into an AC voltage ($V_{INV}$) having a controlled RMS value or a controlled frequency,
wherein said second electronic control circuit (10) comprises a voltage divider (21) connected to said applicator (2) for drawing a predetermined voltage portion ($V_{PAR}$) and a DC voltage adder circuit (22) past said voltage divider (21), said second electronic control circuit (10) being connected to the grid terminal (G) of said triode (19) for controlling grid voltage ($V_G$)

according to an instantaneous value of said AC voltage ($V_{INV}$) at an output (14) of said inverter (11), wherein said voltage divider (21) comprises an inductor ($L_{AG}$) inserted between the anode (A) and the grid (G) of the triode (19) or an inductor ($L_{GK}$) inserted between the cathode (K) and the grid (G) of the triode (19), and further comprises an inductor ($L_B$) having a terminal (24) electrically connected to the grid terminal (G) for blocking the DC voltage, and wherein said programmable central control unit PLC (23) controls at least an output voltage ($V_{INV}$) of said inverter (11) and said second electronic control circuit (8) such to vary power emitted by the electromagnetic field and ensure a constant oscillation of said triode (19).

2. The device as claimed in claim 1, wherein said DC voltage adder circuit (22) is connected to said grid terminal (G) of said triode (19) to adapt an average value of said grid voltage ($V_G$) and ensure continuous oscillation of said triode (19).

3. The device as claimed in claim 2, wherein said adder circuit (22) comprises one or both of an equivalent variable resistor (R) or an equivalent voltage generator (E) with a variable tension.

4. The device as claimed in claim 1, wherein said power supply (5) comprises an amplifier (12) having a voltage transformer (16) connected to said output (14) of said inverter (11) and a rectifier (18) connected to an output (15) of the transformer and to said oscillator (4), said amplifier (12) being configured to provide said AC voltage ($V_{INV}$) to said output (15).

5. The device as claimed in claim 4, wherein said amplifier (12) comprises an input (13) connected to said output (14) of said inverter (11) and an output (15) connected to said oscillator (4).

6. The device as claimed in claim 1, wherein said applicator (2) comprises the at least one pair of electrodes (26, 27) emitting and directing said electromagnetic field in said working area (3).

7. The device as claimed in claim 6, wherein said applicator (2) comprises a capacitor (28) with plates (29, 30) electrically serially connected to said electrodes (26, 27).

8. The device as claimed in claim 7, wherein said plates (29, 30) are substantially flat and at a fixed distance from each other.

9. A plant for treating products by an alternate electromagnetic field in an RF band, comprising:
a working area (3) in which the products to be treated are placed; and
a device (1) for generating an alternate RF electromagnetic field in said working area (3) and comprising:

an applicator (2) having at least one pair of electrodes (26, 27) for emitting the electromagnetic field ranging from 5 MHz to 500 MHz in the working area (3);

an oscillator (4) for providing an alternate AC voltage ($V_{RF}$) and an alternate current ($I_{RF}$) each having a predetermined value and a predetermined frequency;

a power supply (5) for supplying a DC voltage ($V_{CC}$) to said oscillator (4), said oscillator (4) comprising a triode (19) having a grid terminal (G), an anode (A), and a cathode (B); and a control system (6) associated with said power supply (5) for controlling electrical parameters of one or more of said alternate AC voltage ($V_{RF}$), alternate current ($I_{RF}$), or frequency provided to said applicator (2) by said oscillator (4);

wherein said control system (6) comprises a programmable central control unit PLC (23), an input port (7) connected to an electric power network (N), a first electronic control circuit (8) which is connected to said input port (7) for instantaneously varying said electrical parameters and instantaneously controlling field emission power to said power supply (5) through an output port (9), a second electronic control circuit (10) for regulating operation of said oscillator (4) connected to the grid terminal (G) of said triode (19), wherein said first electronic control circuit (8) is an inverter (11) converting an electric power network voltage having a constant frequency and a constant RMS value, into an AC voltage ($V_{INV}$) having a controlled RMS value or a controlled frequency, wherein said second electronic control circuit (10) comprises a voltage divider (21) connected to said applicator (2) for drawing a predetermined voltage portion ($V_{PAR}$) and a DC voltage adder circuit (22) past said voltage divider (21), said second electronic control circuit (10) being connected to the grid terminal (G) of said triode (19) for controlling grid voltage ($V_G$) according to an instantaneous value of said AC voltage ($V_{INV}$) at an output (14) of said inverter (11), wherein said voltage divider (21) comprises an inductor ($L_{AG}$) inserted between the anode (A) and the grid (G) of the triode (19) or an inductor ($L_{GK}$) inserted between the cathode (K) and the grid (G) of the triode (19), and further comprises an inductor ($L_B$) having a terminal (24) electrically connected to the grid terminal (G) for blocking the DC voltage, and wherein said programmable central control unit PLC (23) controls at least an output voltage ($V_{INV}$) of said inverter (11) and said second electronic control circuit (8) such to vary power emitted by the electromagnetic field and ensure a constant oscillation of said triode (19).

* * * * *